(12) United States Patent
Tseng et al.

(10) Patent No.: US 7,728,914 B2
(45) Date of Patent: Jun. 1, 2010

(54) POSITION ENCODED SENSING DEVICE WITH AMPLIFIED LIGHT REFLECTION INTENSITY AND A METHOD OF MANUFACTURING THE SAME

(75) Inventors: Hsu-Ping Tseng, Hsinchu (TW); Chen-Hsien Liao, Taipei (TW)

(73) Assignee: Au Optronics Corporation (TW)

( * ) Notice: Subject to any disclaimer, the term of this patent is extended or adjusted under 35 U.S.C. 154(b) by 1453 days.

(21) Appl. No.: 10/765,076

(22) Filed: Jan. 28, 2004

(65) Prior Publication Data

US 2005/0162401 A1 Jul. 28, 2005

(51) Int. Cl.
*G02F 1/1335* (2006.01)

(52) U.S. Cl. .................... 349/12; 345/173; 345/175

(58) Field of Classification Search ................... None
See application file for complete search history.

(56) References Cited

U.S. PATENT DOCUMENTS

| | | | | |
|---|---|---|---|---|
| 4,945,348 A | * | 7/1990 | Ibamoto et al. | 345/104 |
| 5,361,163 A | * | 11/1994 | Matsuda et al. | 359/452 |
| 5,631,750 A | * | 5/1997 | Minoura et al. | 349/110 |
| 6,219,119 B1 | * | 4/2001 | Nakai | 349/113 |
| 6,597,427 B1 | * | 7/2003 | Katsu et al. | 349/192 |
| 6,661,485 B2 | * | 12/2003 | Moon | 349/113 |
| 6,894,746 B1 | | 5/2005 | Manabe et al. | |
| 2002/0044241 A1 | * | 4/2002 | Matsuo | 349/113 |
| 2002/0190643 A1 | * | 12/2002 | Cummings et al. | 313/553 |
| 2003/0222980 A1 | * | 12/2003 | Miyagaki et al. | 348/115 |
| 2004/0130783 A1 | * | 7/2004 | Solomon | 359/462 |

FOREIGN PATENT DOCUMENTS

| | | |
|---|---|---|
| CN | 1408069 A | 4/2003 |
| JP | 2000-172437 | 6/2000 |

OTHER PUBLICATIONS

Office Action of its corresponding Chinese patent application issued on Jul. 27, 2007.

* cited by examiner

*Primary Examiner*—David Nelms
*Assistant Examiner*—Lucy P Chien
(74) *Attorney, Agent, or Firm*—Arent Fox LLP

(57) ABSTRACT

A display panel for amplifying light reflection intensity. The display includes a substrate, at least one protrusion on one face of the substrate, and a light reflective layer deposited on the at least one protrusion. The at least one protrusion amplifies light reflection intensity when light is reflect off the light reflective layer.

23 Claims, 6 Drawing Sheets

POSITION ENCODED SENSING DEVICE WITH AMPLIFIED LIGHT REFLECTION INTENSITY AND A METHOD OF MANUFACTURING THE SAME

BACKGROUND OF THE INVENTION

1. Field of the Invention

The present invention relates to a position sensing device having a light reflecting amplification structure and a method manufacturing the position sensing device. In particular, the present invention relates to a position encoded liquid crystal display (PELCD) sensing device having a light reflecting amplification structure disposed therein, wherein the light reflecting amplification structure amplifies and increases the intensity of light reflection of the PELCD so that the detection of display position sensing code(s) can be improved.

2. Related Art

Flat panel displays have become very popular in the electronic industry. Flat panel displays are generally provided in electronic products such as notebook computers, display monitors for personal computers, and especially handheld devices such as PDAs. Some flat panel displays are position sensible liquid crystal display (PSLCD) devices whereby the PSLCD can sense the position of stylus when the stylus is in direct contact with the display panel. However, the PSLCD devices of the related art contain complex structures requiring additional control circuitries; and are thick in size and heavy in weight.

In order to overcome the above mentioned disadvantages, there is a need to have a flat screen display device that can employ a position encoded liquid crystal display (PELCD) sensing device having a light reflecting amplification structure disposed therein so that the PELCD sensing device can increase and amplify the reflection of light to detect code information.

SUMMARY OF THE INVENTION

One example of the present invention provides a display panel for amplifying light reflection intensity. The display panel includes a substrate, at least one protrusion on a face of the substrate, and a light reflective layer deposited adjacent to the protrusion, wherein the protrusion amplifies light reflection intensity when light is reflect off the light reflective layer.

In another example, the present invention is directed to a method of manufacturing a light reflecting amplification structure. The method includes the steps of forming at least one protrusion on one face of a substrate, and depositing a light reflective layer on the protrusion. The protrusion amplifies light reflection intensity when light is reflect off the light reflective layer.

DESCRIPTION OF THE DRAWINGS

The accompanying drawings, which are included to provide a further understanding of the present invention and are incorporated in and constitute a part of this specification, illustrate examples of the present invention and together with the description serve to explain the principles of the present invention. In the drawings.

DETAILED DESCRIPTION OF THE EXEMPLARY EMBODIMENTS

Reference will now be made in detail to the exemplary embodiments of the present invention, examples of which are illustrated in the accompanying drawings.

The present invention relates to a flat panel display device that employs a position encoded liquid crystal display (PELCD) panel having a light reflecting amplification structure disposed therein together with a transceiver.

Figure 1:
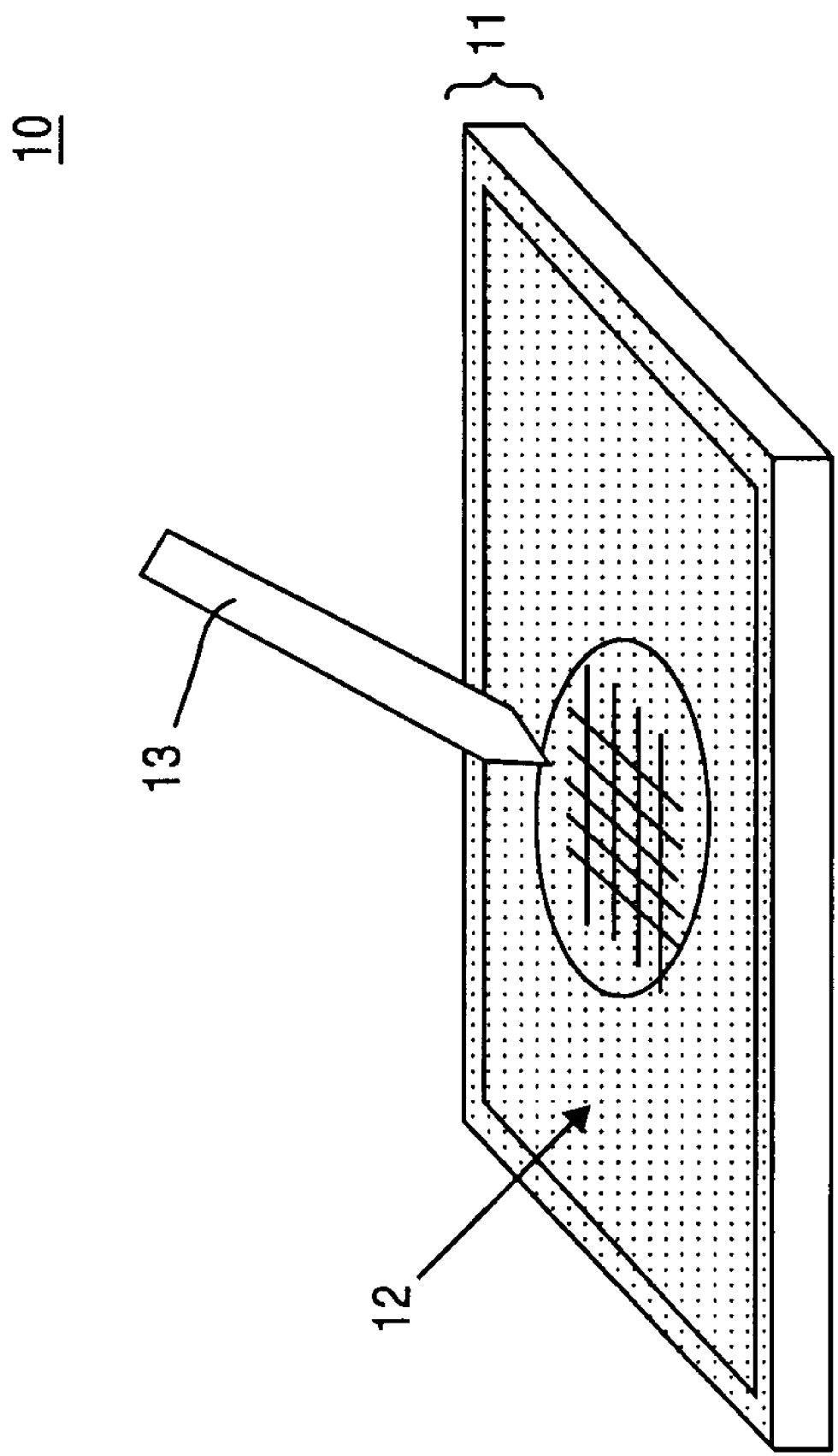
FIG. 1 illustrates a configuration of a position encoded liquid crystal display sensing device in accordance with a preferred embodiment of the present invention.

FIG. 1 illustrates one example of the PELCD device 10 of the present invention. In particular, the PELCD device 10 includes a position encoded LCD panel 11 having a light reflecting amplification structure disposed therein. In addition, the PELCD device 10 includes a transceiver 13. Embedded within the position encoded LCD panel 11 is a high reflective layer which includes one or more high reflective plate(s). At least one of the high reflective plate includes programmable code information 12 such as display panel position sensing code information. The display panel position sensing code information can be preprogrammed or can be dynamically programmed to correspond to information or data which is displayed on the LCD 11. In addition, the display panel position sensing code information can be embedded with the LCD 11 as a position code pattern.

FIG. 1 also illustrates a transceiver 13 that emits light and receives light. The transceiver 13 can be a digital stylus having a transmitter and receiver (not shown) of light waves, such as infra red (IR) light waves, and/or ultra violet (UV) light waves. In addition, the transceiver 13 is connected to a processing unit (not shown) whereby the transceiver 13 sends information to and receives information from the processing unit.

Figure 2:
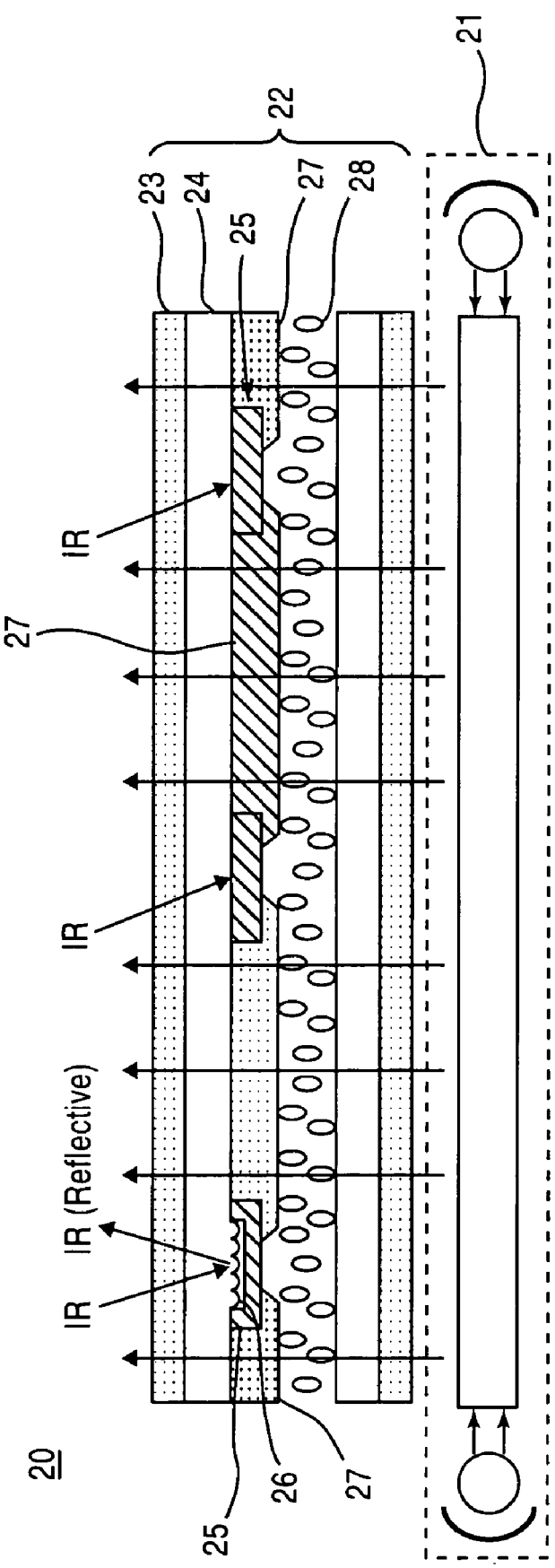
FIG. 2 illustrates one example of a cross-sectional view of the PELCD in accordance with the present invention.

FIG. 2 shows a sectional view of a PELCD 20 having a light reflecting amplification structure disposed therein, in accordance with one example of the present invention.

Specifically, FIG. 2 illustrates a sectional view of the PELCD 20 having a plurality of layers. The PELCD 20 includes a back light layer 21 with a LCD panel 22. The LCD panel 22 has a polarizing plate layer 23 such as a polarizing filter. The polarizing plate layer 23 is disposed on one face of a light reflecting amplification structure 24 for amplifying and increasing the light reflection intensity and light reflection angles. The LCD panel 22 also includes a black matrix layer 25 and a high reflective layer 26. The high reflective layer 26 has one or more high reflective plate(s) made up of material such as Cr, Al, and Ag, or any material that can reflect light, or any structure that can reflect light, and is disposed on one surface of the black matrix layer 25. The high reflective layer 26 together with the black matrix layer 25 are both disposed on the other face of the light reflecting amplification structure 24. Moreover, a layer of color filters 27 is disposed between the elements of the black matrix 25 and the high reflective layer 26. The layer of color filters 27 has at least a red color filter, a green color filter, and a blue color filter (RGB color filters). Furthermore, the LCD panel 22 includes an ITO layer 28 of electrodes disposed below the black matrix 25, the high reflective layer 26 and the layer of color filters 27.

Figure 3:
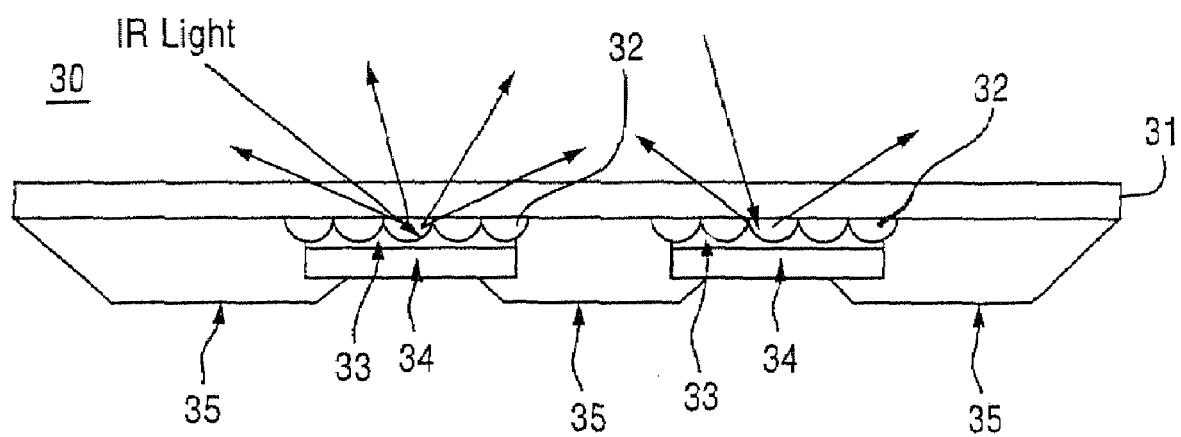
FIG. 3 illustrates another example of a cross-sectional view of the PELCD in accordance with the present invention.

FIG. 3 illustrates a sectional view of a PELCD 30 with a light reflecting amplification structure 31 for increasing and amplifying the light reflection intensity and the light reflection angle in accordance with another example of the present invention.

Referring to FIG. 3, there is a light reflecting amplification structure 31 made of a transparent material such as a glass substrate or a plastic substrate. The light reflecting amplification structure 31 has one or more protrusion(s) 32 disposed at predetermined locations on one of the face thereof. According to the present invention, the entire light reflecting amplification structure 31 including the protrusion(s) 32 can be made of the same transparent material such as glass. In another example of the present invention, the protrusion(s) 32 is made of a separate transparent material than that of the plate-like upper layer of the light reflecting amplification structure 31. The protrusion(s) 32 can be arcuate and/or angular in shape, such as semicircular, triangular, etc. For instance, the protrusion(s) 32 can be any optimal shape having optimal light reflecting amplification qualities.

Furthermore, the sectional view of the PELCD 30 as shown in FIG. 3 includes a high reflective layer 33 and a black matrix layer 34. The high reflective layer 33 has one or more high reflective plate(s) made up of material such as Cr, Al, and Ag, or any material that can reflect light, or any structure that can reflect light and includes encoded information such as display panel position sensing code information. In one example of the present invention, one face of the high reflective plate is disposed against the protrusions 32, such that the one face of the reflective plate covers the surfaces of the protrusions 32. For instance, the one face of the reflective plate is conformed to the configuration of the protrusions 32. In addition, the other face of the high reflective plate is disposed on one surface of the black matrix layer 34 having programmable code information embedded thereon. For instance, the one surface of the black matrix 34 which abuts the other face of the high reflective plate includes programmable code information on the one surface. In addition, the programmable code information are made of the reflective metal over the protrusions with the same sizes and positions completely. Also, the code information and the protrusions are embedded in the black matrix. Therefore, the programmable code information are between the black matrix and the protrusions. Moreover, FIG. 3 illustrates a layer of color filters 35 such that the color filters are disposed between the high reflective layer 33, the black matrix 34, at least one of the protrusions 32. The layer of color filters 35 has at least a red color, a green color, and a blue color filter (RGB color filter).

A method for fabricating the light reflecting amplification structure according to one embodiment of the present invention will be described below with reference to the accompanying drawings.

Figure 4A:
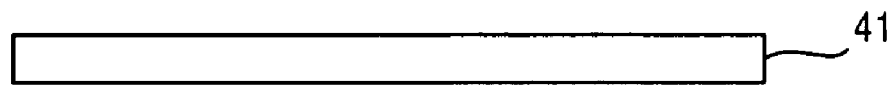
FIG. 4(a) to 4(d) illustrates cross-sectional views showing a method for fabricating the light reflecting amplification structure with the high reflective plate according to one example of the present invention.
Figure 4B:

FIGS. 4(a) to 4(d) are cross-sectional views showing the process steps of a method for fabricating the light reflecting amplification structure with the high reflective plate according to one example of the present invention. FIG. 4(a) shows a silicon layer 41 such as a layer of glass substrate, formed to be a plate-like configuration. After the silicon layer 41 is formed, one or more transparent film(s) 42 can be deposited at predetermined location(s) on one face of the silicon layer 41, as shown in FIG. 4(b). For instance, the transparent film(s) 42 is sputtered on the one face of the silicon layer 41; or the transparent film(s) 42 is coated by a spin coater machine on to the one face of the silicon layer 42.

Figure 4C:
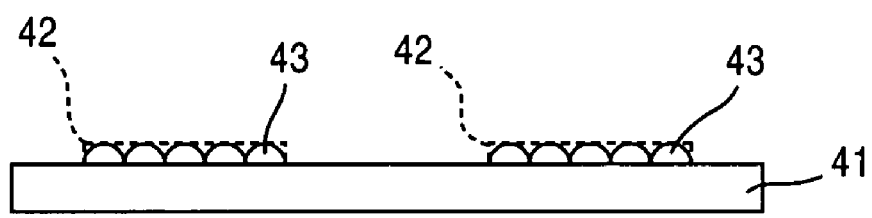

Once the transparent film(s) 42 is deposited on the silicon layer 42, the transparent thin film(s) 42 is etched to create one or more protrusion(s) 43 extending from the one face of the silicon layer 41 as shown in FIG. 4(c). For instance, the transparent thin film(s) 42 is etched to create arcuate or angular protrusions 43, such as semicircular or triangular in shape. In addition, the etching of the transparent thin film 42 is performed by exposing the thin film 42 to the exposure process for photo resist, or applying plasma, and ion-beam process to destroy the surface of the metal surface, or using the chemical reaction to make the metal surface rough.

Figure 4D:
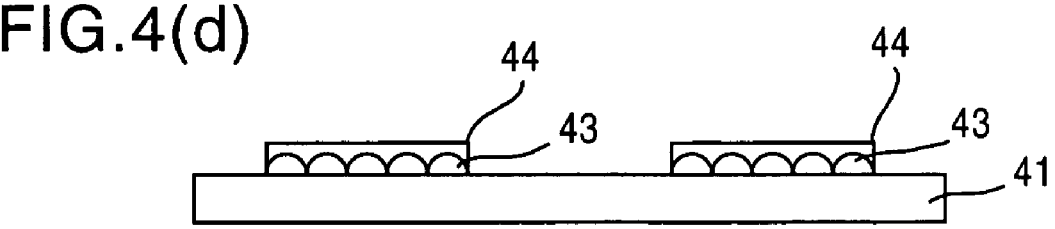

After the protrusion(s) 43 are formed on the one face of the silicon layer 41 by anyone of the methods above, a high reflective material is deposited on the surfaces of the protrusion(s) 43 such that the high reflective material covers and conforms to the configuration of the protrusion(s) 43. The high reflective material deposited on the surfaces of the protrusion(s) becomes a high reflective plate 44 as shown in FIG. 4(d). The high reflective material can be a material such as Cr, Al, or Ag, or any material that can reflect light, or any structure that can reflect light or any combination thereof.

Figure 5A:
FIG. 5 illustrates cross-sectional views showing a method for fabricating the light reflecting amplification structure with the high reflective plate according to another example of the present invention.
Figure 5B:
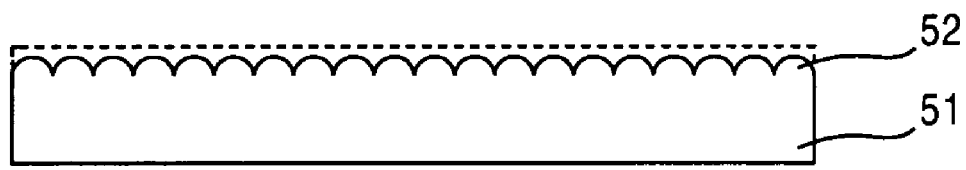
Figure 5C:
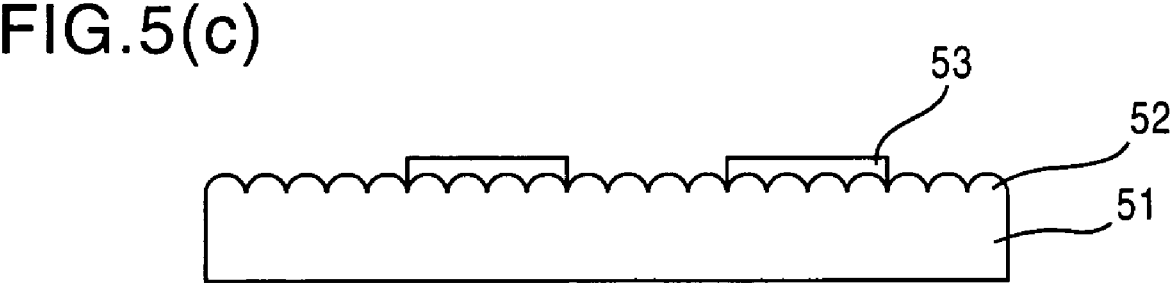

FIGS. 5(a) to 5(c) are cross-sectional views showing the process steps of a method for fabricating the light reflecting amplification structure with the high reflective plate according to another example of the present invention. FIG. 5(a) shows a silicon layer 51 such as a layer of glass substrate, formed to be a plate-like configuration.

After the silicon layer 51 is formed, one face of the silicon layer 51 is etched or scratched to create one or more protrusion(s) 52 extending from one face of the silicon layer 51 as shown in FIG. 5(b). For instance, the silicon layer 51 is etched to create arcuate or angular protrusions 52, such as semicircular or triangular in shape on predetermined locations of the one face of the silicon layer 51, or uniformly through out the one face of the silicon layer 51. In addition, the etching of the silicon layer 51 is performed by exposing the silicon layer 51 to sand papers or hard and rough surface plates for rubbing the surface of the glass substrate.

After the protrusion(s) 52 are formed on the one face of the silicon layer 51 by anyone of the methods above, a high reflective material is deposited on the surfaces of the protrusion(s) 52 such that the high reflective material covers and conforms to the configuration of the protrusion(s) 52. The high reflective material deposited on the surfaces of the protrusion(s) 52 becomes the high reflective plate 53 as shown in FIG. 5(c). The high reflective material can be a material such as Cr, Al, or Ag, or any material that can reflect light, or any structure that can reflect light or any combination thereof.

Figure 6:
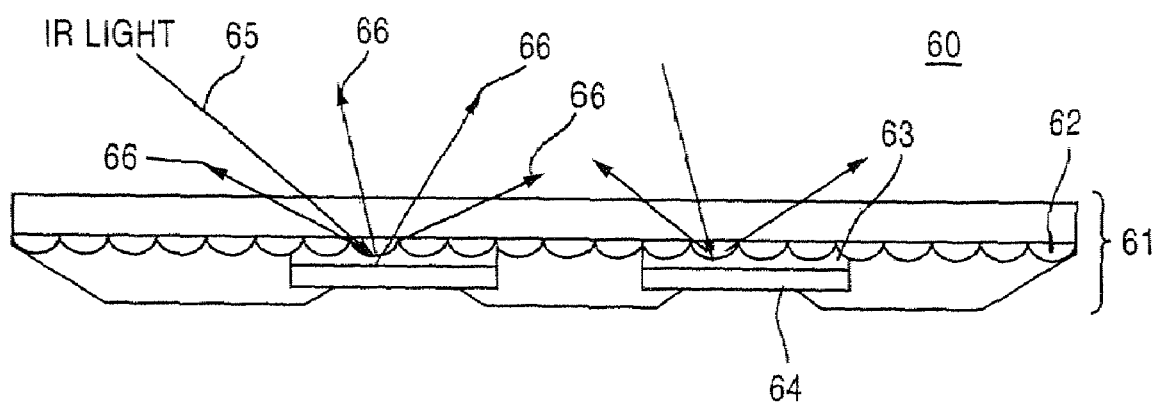
FIG. 6 illustrates another example of a cross-sectional view of the PELCD in accordance with the present invention.

FIG. 6 illustrates a sectional view of a PELCD 60 with a light reflecting amplification structure 61 for increasing and amplifying the light reflection intensity and the light reflection angle in accordance with another example of the present invention.

Referring to FIG. 6, there is a light reflecting amplification structure 61 made of a transparent material such as a glass substrate or plastic substrate. The light reflecting amplification structure 61 includes one or more protrusion(s) 62 disposed at predetermined locations on one of the face thereof. According to this example of the present invention, the entire light reflecting amplification structure 61 including the protrusion(s) 62 is made of the same transparent material such as glass. The protrusion(s) 62 can be arcuate and/or angular in configuration, such as semicircular, triangular, etc. For instance, the protrusion(s) 62 is any optimal configuration having optimal light reflecting amplification qualities.

Furthermore, the sectional view of the PELCD 60 as shown in FIG. 6 includes a high reflective layer 63 and a black matrix layer 64. The high reflective layer 63 includes one or more high reflective plate(s) made up of material such as Cr, Al, or Ag, or any material that can reflect light, or any structure that can reflect light. In one example of the present invention, one face of the high reflective plate is disposed against the protrusions 62, such that the one face of the reflective plate covers the surfaces of the protrusions 62. For instance, the one face of the reflective plate is conformed to the configuration of the protrusions 62. In addition, the other face of the high reflective plate is disposed on one surface of the black matrix layer 64 having programmable display panel sensing code information embedded thereon. For instance, the one surface of the black matrix 64 which abuts the other face of the high reflective plate includes programmable display panel sensing code information on the one surface. In addition, the programmable code information made of the reflective metal over the protrusions with the same sizes and positions completely. Also, the code information and protrusions are embedded in the black matrix. Therefore, the programmable code information are between the black matrix and the protrusions.

A transceiver such as a stylus as shown in FIG. 1 can be positioned proximal to a PELCD of the present invention. The transceiver emits light waves, such as Infra-Red (IR) light and/or Ultra-Violet (UV) light from the transceiver to the surfaces and layers of the PELCD. The light waves emitted from the transceiver are reflected back from the surfaces and the layers of the PELCD. When the light waves are reflected back from the light reflective layer, the reflective light intensity is amplified and increased by the protrusion(s) disposed on the one face of the substrate. Therefore, the amplified reflective light waves are subsequently received and/or detected by the transceiver. For example, FIG. 6 shows a ray of IR light 65 emitted to the PELCD 61. The IR light 65 traverses through the glass substrate and through one face of the protrusions 62. Thereafter, the IR light 65 encounters the high reflective material 63 and the IR light 65 is reflected back out of the PELCD 61. Upon the IR light 65 being reflected back out of the PELCD 61, the reflected IR light 66 is amplified by the other face of the protrusions 62 such that the intensity of the reflected IR light 66 is amplified and increased. As such, the amplified reflected IR light 66 provides optimal reception and detection of the reflected IR light 66 by the transceiver. In addition, the amplified reflected IR light 66 provides optimal reception and detection of the programmable code information, such as the display panel position sensing codes by the transceiver.

It will be apparent those skilled in the art that various modifications and variations can be made in the position encoded liquid crystal display device of the present invention without departing from the spirit or scope of the invention. Thus, it is intended that the present invention cover the modifications and variations of this invention provided they come within the scope of the appended claims and their equivalents.

We claim:

1. A display panel for amplifying light reflection intensity, the display panel comprising:
   a substrate;
   at least one protrusion disposed on a surface of the substrate
   a light reflective layer deposited on a surface of the protrusion opposite the substrate, wherein the protrusion amplifies light reflection intensity when light is reflect off the light reflective layer; and
   a light shielding layer disposed on a surface of the light reflective layer opposite the at least one protrusion, wherein the light reflective layer comprises programmable code information and the protrusion amplifies the light reflection intensity such that the programmable code information is optimally detected.

2. The display panel of claim 1, wherein the programmable code information comprises at least one position sensing code.

3. The display panel of claim 1, wherein the protrusion is configured to optimally amplify light reflective intensity.

4. The display panel of claim 3, wherein the protrusion comprises at least one arcuate protrusion or at least one angular protrusion.

5. The display panel of claim 1, wherein the light reflective layer is disposed between the protrusions and the light shielding layer, such that the programmable code information is located between the protrusions and the light shielding layer.

6. The display panel of claim 1, further comprising:
   a plurality of protrusions formed on a part of the surface of the substrate.

7. The display panel of claim 1, further comprising:
   a plurality of protrusions formed on and throughout the surface of the substrate.

8. The display panel of claim 1, wherein the substrate and the protrusion comprise the same material.

9. The display panel of claim 1, wherein the substrate and the protrusion comprise different transparent materials.

10. The display panel of claim 1, wherein the light reflective layer comprises at least one selected from a group consisting of Cr, Al, and Ag.

11. A liquid crystal display panel comprising:
    a substrate;
    a plurality of protrusions disposed on a surface of the substrate;
    a light reflective layer disposed on a surface of the plurality of protrusions opposite the substrate, wherein the light reflective layer comprises programmable code information;
    a light shielding layer disposed on a surface of the light reflective layer opposite the plurality of protrusions; and
    a plurality of color filters, wherein the light shielding layer and the light reflective layer are between adjacent color filters.

12. The liquid crystal display panel of claim 11, wherein the programmable code information comprises at least one position sensing code.

13. The liquid crystal display panel of claim 11, wherein the plurality of protrusions are at least one selected from a group consisting of arcuate protrusions and angular protrusions.

14. The liquid crystal display panel of claim 11, wherein the light reflective layer is located between the plurality of protrusions and the light shielding layer, and thereby the programmable code information is located between the plurality of protrusions and the light shielding layer.

15. The liquid crystal display panel of claim 11, wherein the plurality of protrusions are formed on a part of the surface of the substrate.

16. The liquid crystal display panel of claim 11, wherein the plurality of protrusions are located on and throughout the surface of the substrate.

17. The liquid crystal display panel of claim 11, wherein the substrate and the plurality of protrusions comprise the same material.

18. The liquid crystal display panel of claim 11, wherein the substrate and the plurality of protrusions comprise different transparent materials.

19. The display panel of claim 11, wherein the light reflective layer comprises at least one selected from a group consisting of Cr, Al, and Ag.

20. The display panel of claim 1, further comprising:
a plurality of light reflective layers disposed on a surface of the at least one protrusion;
a plurality of light shielding layers, wherein each light shielding layer is disposed on the surface of a light reflective layer opposite the at least one protrusion; and
a plurality of color filters, wherein the plurality of color filters are disposed on the surface of the substrate, and wherein at least one light shielding layer and at least one light reflective layer are located between adjacent color filters.

21. The liquid crystal display panel of claim 11, wherein two adjacent color filters are spaced apart by a light shielding layer and a light reflective layer.

22. The display panel of claim 1, wherein the at least one protrusion is disposed directly on the surface of the substrate, the light reflective layer is deposited directly on the surface of the protrusion opposite the substrate, and the light shielding layer is disposed directly on the surface of the light reflective layer opposite the at least one protrusion.

23. The liquid crystal display panel of claim 11 wherein the plurality of protrusions are disposed directly on the surface of the substrate, the light reflective layer is disposed directly on the surface of the plurality of protrusions opposite the substrate, and the light shielding layer is disposed directly on the surface of the light reflective layer opposite the plurality of protrusions.

* * * * *